(12) United States Patent
Nishimura et al.

(10) Patent No.: US 7,466,532 B2
(45) Date of Patent: Dec. 16, 2008

(54) IGNITION CIRCUIT FOR SQUIB

(75) Inventors: Junichi Nishimura, Saitama-ken (JP); Hiromi Aida, Saitama-ken (JP); Kazuo Matsuda, Saitama-ken (JP); Kazutaka Saito, Saitama-ken (JP); Etsuya Miyake, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 502 days.

(21) Appl. No.: 11/028,787

(22) Filed: Jan. 4, 2005

(65) Prior Publication Data

US 2005/0241520 A1 Nov. 3, 2005

(30) Foreign Application Priority Data

Jan. 29, 2004 (JP) .............................. 2004-020972

(51) Int. Cl.
*F23Q 7/00* (2006.01)
*F42C 1/00* (2006.01)

(52) U.S. Cl. ........................................ 361/251; 102/217

(58) Field of Classification Search ................. 361/251; 102/217
See application file for complete search history.

(56) References Cited

U.S. PATENT DOCUMENTS

| | | | |
|---|---|---|---|
| 3,167,014 A | 1/1965 | Kopito | |
| 5,309,841 A * | 5/1994 | Hartman et al. | 102/202.4 |
| 5,403,036 A | 4/1995 | Zakula et al. | |
| 5,554,890 A | 9/1996 | Kinoshita | |
| 5,847,309 A | 12/1998 | Baginski | |
| 5,905,226 A | 5/1999 | Baginski | |
| 6,192,802 B1 | 2/2001 | Baginski | |
| 6,467,414 B1 * | 10/2002 | Fisher | 102/202.4 |
| 6,709,012 B1 | 3/2004 | Tanaka et al. | |

FOREIGN PATENT DOCUMENTS

| | | |
|---|---|---|
| DE | 42 29 624 A1 | 3/1993 |
| EP | 1 205 363 A1 | 5/2002 |

* cited by examiner

*Primary Examiner*—Michael J Sherry
*Assistant Examiner*—Lucy Thomas
(74) *Attorney, Agent, or Firm*—Carrier, Blackman & Associates, P.C.; Joseph P. Carrier; William D. Blackman

(57) ABSTRACT

An ignition circuit for squib for igniting a squib which has a heat producing portion that includes an electrically conductive portion and a fuel portion, and transmits a heat produced by supplying electrical current to the electrically conductive portion to the fuel portion, the circuit having an electrical current boosting device which steeply boosts electrical current supplied to the electrically conductive portion. The ignition circuit achieves electrical operation with greater reliability and less cost.

15 Claims, 2 Drawing Sheets

IGNITION CIRCUIT FOR SQUIB

BACKGROUND OF THE INVENTION

1. Field of the Invention

The present invention relates to an ignition circuit for a squib (ignition apparatus) which is used in a system which employs an explosive, such as, for example, an air bag device or a pretensioner apparatus for an automobile, and particularly relates to an ignition circuit for a squib which can be ignited with low energy.

Priority is claimed on Japanese Patent Application No. 2004-020972, filed Jan. 29, 2004, the content of which is incorporated herein by reference.

2. Description of Related Art

In recent years, a squib is used for the purpose of igniting a gas generating agent in order to operate a system such as, for example, an air bag device or a pretensioner apparatus.

Generally, a squib is attached to an inflator which contains a gas generating agent of the apparatus which employs each explosive.

As a structure of the squib, a heat producing portion is attached to a header which fixes a pin, and an explosive is press-inserted in order to contact with the heat producing portion by a cup.

The pin of the squib is electrically connected with a control unit which is used as a master.

Moreover, as the squib which is mounted to a safety device for an automobile which is increasing in recent years, a low energy squib which operates with slight electric power is proposed.

This kind of low energy squib has the heat producing portion which includes an electrically conductive portion and a fuel portion, and has a structure which efficiently produces heat as compared with an ordinary squib (Patent Document 1: U.S. Pat. No. 5,847,309, Patent Document 2: U.S. Pat. No. 5,905,226, and Patent Document 3: U.S. Pat. No. 6,192,802).

When electrical current is supplied to the heat generation portion, an excited chemical reaction occurs, and a great amount of heat is generated.

In order to operate the low energy squib which is constituted in such a manner, first of all, when the collision of a car is detected with the signal from a sensor by the control unit, the control unit supplies electrical current from an ignition circuit to each squib which is attached thereto in order to operate each safety device (several A (amperes)×several millisec).

The heat producing portion is heated by this supplied electrical current, and thereby explosive which is adjacent to the heat producing portion is ignited.

Furthermore, each safety device is operated by making a gas generating agent ignited in the inflator with heat and pressure of an explosive which was ignited.

However, conventionally, since electrical current was supplied for a long time (on the order of milliseconds) for the low energy squib as well as the ordinary squib, a large quantity of heat was diffused from the heat producing portion to the outside because a supplying time of electrical current is long, and it was difficult for heat to be efficiently transmitted to the heat producing portion.

Therefore, in order to operate the low energy squib, surplus energy was needed, thereby there was a problem in that an obstacle for further reduction in energy arose.

SUMMARY OF THE INVENTION

The present invention has been conceived in the light of the above problems as well, and an object thereof is to provide the ignition circuit for the squib by which the heat can be efficiently transmitted to the heat producing portion, and further reduction in energy can be attained.

In order to solve the above-described problems, the present invention has adopted the following means.

The present invention is an ignition circuit for a squib for igniting the squib which has a heat producing portion including an electrically conductive portion and a fuel portion, and transmits heat produced by supplying electrical current to the electrically conductive portion to the fuel portion, the circuit having an electrical current boosting device which steeply boosts the electrical current supplied to the electrically conductive portion.

According to the present invention, because the electrical current supplied to the electrically conductive portion is steeply boosted by the electrical current boosting device, thereby a necessary amount of heat for ignition can be generated within the electrically conductive portion in a short time and is transmitted to the fuel portion, a quick operation can be attained.

Moreover, since an operation with low energy becomes possible, a reduction in cost can be attained, while reliability can be improved.

The present invention may be the ignition circuit for a squib in which the electrical current boosting device shortens the time for supplying the electrical current to the electrically conductive portion to be on the order of microseconds.

According to the present invention, because thermal diffusion to the exterior can be controlled to the minimum, the heat can thereby be efficiently transmitted from the electrically conductive portion to the fuel portion, and the reliability can be further improved.

In the present invention, the electrical current boosting device may be a condenser.

According to the present invention, since the electrical current can be steeply boosted using a characteristic of the condenser, and an amount of accumulation of electricity required for generation of heat can be lessened, and the condenser can be miniaturized, thereby a layout quality and a loading performance can be improved, while a reduction in cost can be attained.

DETAILED DESCRIPTION OF THE INVENTION

In the following, the ignition circuit for a squib according to the preferred embodiment of the present invention will be explained with reference to the figures.

Figure 1:
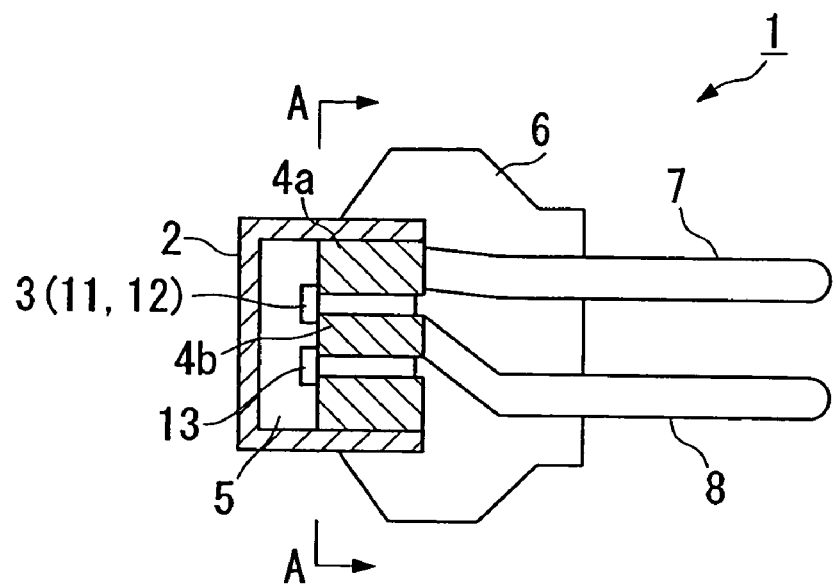
FIG. 1 is a vertical sectional view of the squib according to the preferred embodiment of the present invention.
Figure 2:
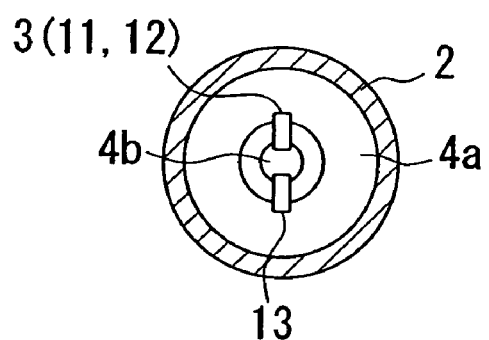
FIG. 2 is A-A sectional view of the squib shown in FIG. 1.

FIG. 1 is a vertical sectional view of the squib (an ignition apparatus) 1 according to the preferred embodiment of the present invention, and FIG. 2 is a cross sectional view at the line A-A of the squib shown in FIG. 1.

As shown in FIG. 1, a squib 1 arranges a control circuit, a condenser 13, and a heat producing portion 3 which is an ignition element at the upper portion of headers 4a and 4b which are provided with pins 7 and 8 which are connection terminals arranged in order to connect with 2-line type of bus line (not shown in the figures) which is a external signal line. Furthermore, an ignition agent 5 which ignites a gas generating agent of an assistant restriction apparatus is arranged at the upper portion of the heat producing portion 3.

In addition, although headers 4a and 4b are arranged being separated from each other in the vertical sectional view shown in FIG. 1, in face, the header 4a is arranged surrounding the surface of the header 4b as shown in FIG. 2.

Moreover, a space between headers 4a and 4b is buried by a spacer and the like in order to fix headers 4a and 4b.

Moreover, the ignition agent 5, the heat producing portion 3, and the headers 4a and 4b are covered with cylindrical cap 2 which is blocked at the upper portion. Furthermore, ignition agent 5, the heat producing portion 3, and the headers 4a and 4b covered with cap 2 are integrated by surrounding with resin mold 6 extending over portions of pin 7 and 8 by mold molding.

In addition, in the above-mentioned explanation, the quality of the material of each portion is an example, and the various correspondence that, for example, the cap 2 is made of metal and the like can be adopted.

Figure 3:
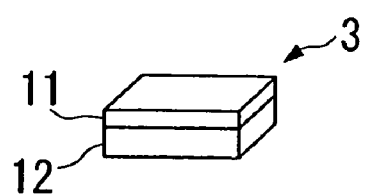
FIG. 3 is a perspective view of the heat producing portion shown in FIG. 1.

Moreover, as shown in FIG. 3, the heat producing portion 3 has the electrically conductive portion 11 and the fuel portion 12.

The electrically conductive portion 11 becomes hot and activates the fuel portion 12 adjacent to the electrically conductive portion 11 in the case in which the electrically conductive portion 11 is supplied with electrical current.

If activated, the fuel portion 12 will start a chemical reaction violently, and will generate a large quantity of heat.

Thus, because the heat producing portion 3 is composed of the electrically conductive portion 11 and the fuel portion 12, it is possible to ignite with lower energy than in the case of using the ordinary squib.

Figure 5:
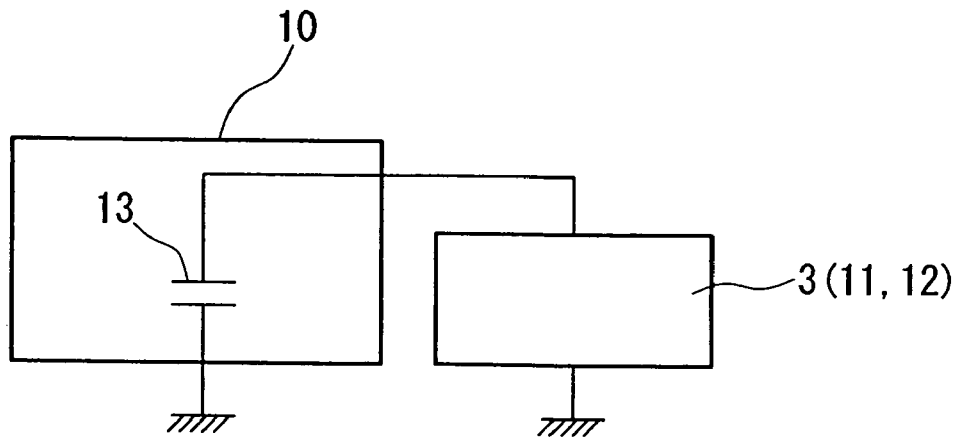
FIG. 5 is a circuit structure view of the squib shown in FIG. 1.

Furthermore, as shown in FIG. 5, the ignition circuit 10 which has a condenser 13 is connected in parallel with the heat producing portion 3 (the electrically conductive portion 11 and the fuel portion 12).

Thereby, a signal of ignition instruction is inputted into the ignition circuit 10, it is constituted that electric power stored in the condenser 13 is supplied to the electrically conductive portion 11, and electrical current which is steeply boosted flows into the electrically conductive portion 11.

This will be described below.

Moreover, the squib 1 is connected to a control unit.

An acceleration sensor (not shown in the drawings) which detects a head-on collision or a side collision of vehicles is connected to a control unit.

Furthermore, the squib 1 is equipped at a position adjacent to propellant of the inflator (gas generation apparatus) of the air bag device which is developed at appropriate location such as a steering wheel, a dashboard, sheets on either side, and left side and right side portions of a roof, and pins 7 and 8 of each squib 1 are connected via a bus (not shown in the drawings).

The squib 1 having such constitutions operates as follows.

First of all, when an acceleration sensor detects the acceleration beyond a predetermined value, the control unit outputs a development command signal to the bus in order to operate the predetermined air bag apparatus.

Furthermore, when the control unit supplies electric power to the bus line, for example, the heat producing portion 3 of the squib 1 ignites the ignition agent 5, and electric power which is necessary for operating the assistant restraint apparatus is stored in the condenser 13.

In this state, when the control unit transmits an ignition execution signal (an ignition execution command) to the squib 1, the ignition circuit 10 of the squib 1 supplies the electric power which is stored in the condenser 13, the ignition agent 5 built in the squib 1 is exploded, and the assistant restraint apparatus can be operated.

At this time, the electrical current which is steeply boosted by the condenser 13 can be supplied to the electrically conductive portion 11.

Figure 4:
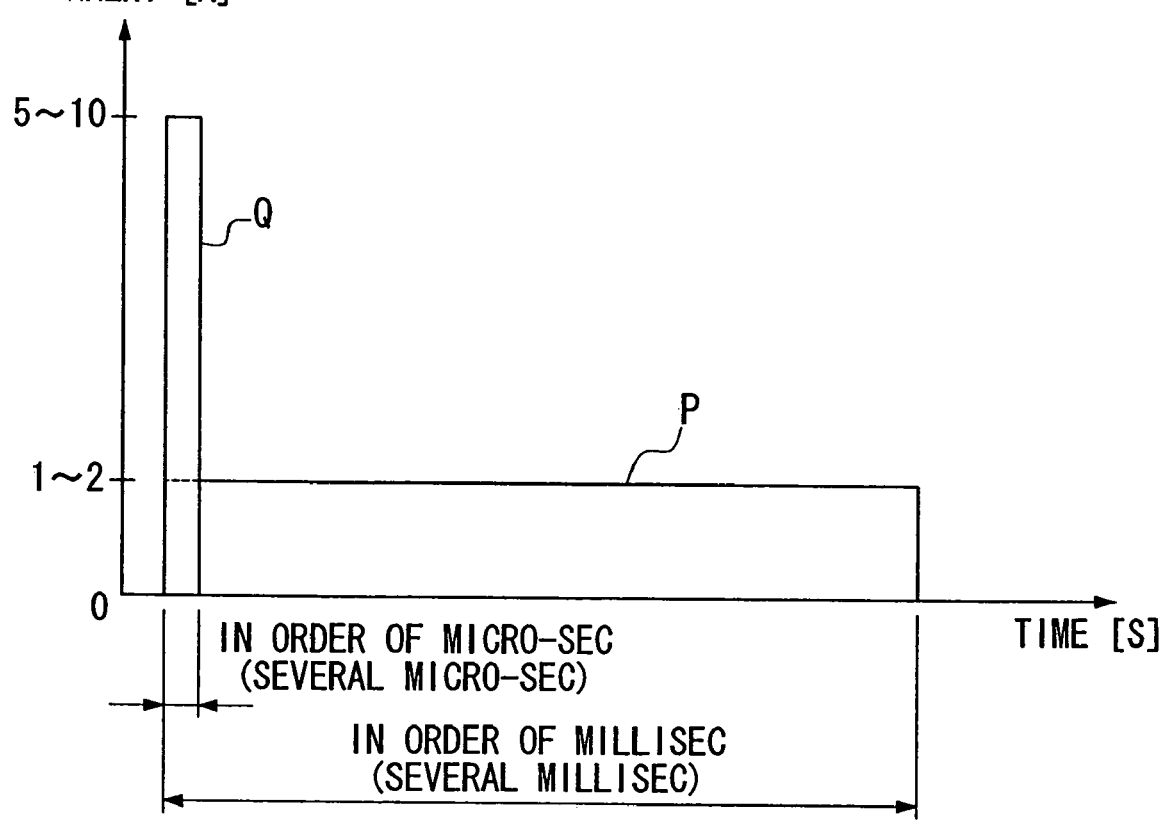
FIG. 4 is a graphical view showing the relationship between time and electrical current.

This is explained referring to FIG. 4.

FIG. 4 is a graphical view showing a relationship between time and electrical current.

In this view, Line P shows the ordinary electrical current wave form, while Line Q shows the electrical current wave form according to the present embodiment, respectively.

Formerly, 1-2 A of the electrical current was supplied for several milliseconds (line P). In contrast, in the present embodiment, 5-10 A of the electrical current is supplied on the order of microseconds (line Q), thereby, compared with the prior art, a large quantity of electrical current is steeply boosted and supplied to the electrically conductive portion 11.

By doing so in this manner, the amount of heat which is necessary for ignition can be generated in the electrically conductive portion 11 in a short time and be transmitted to the fuel portion 12, and thereby a rapid operation can be performed.

Moreover, since an operation with low energy becomes possible, a reduction in the cost of the squib 1 or the condenser 13 can be attained, while reliability can be improved.

In addition, although the wave form shown in this view is a rectangular wave, it is not necessarily a rectangular wave.

Moreover, when the ordinary type of squib, which is not a low energy squib, was supplied the electrical current which is steeply boosted, it was possible to make the wiring blow out before a sufficient quantity of heat is transmitted to the fuel portion. Therefore, countermeasures for this problem were needed.

However, in the case of the low energy squib 1 such as in the present embodiment, such countermeasures are not needed because the electrically conductive portion 11 is heated before the wiring blows out, and the fuel portion 12 starts a chemical reaction and can generate a necessary quantity of heat for ignition.

In addition, because the condenser 13 shortens a time for supplying the electrical current to the electrically conductive portion 11 on the order of microseconds, thermal diffusion to the exterior can be controlled to the minimum, and thereby the quantity of heat can be efficiently transmitted to the fuel portion 12, and reliability can be improved further.

Moreover, because the condenser 13 is used for the electrical current boosting device which steeply boosts the electrical current supplied to the electrically conductive portion 11, electrical current can be steeply boosted using a characteristic of the condenser.

Moreover, because an amount of accumulation of electricity required for generation of heat can be reduced, the condenser 13 can be miniaturized, and thereby a layout quality and a loading performance can be improved, while a reduction in cost can be attained.

In addition, the electrical current boosting device may be a device other than the condenser 13.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An ignition circuit for igniting a low energy squib which has a heat producing portion including an electrically conductive portion disposed in engagement together with a fuel portion, and transmits heat produced by supplying electrical current to the electrically conductive portion to the fuel portion,
   the ignition circuit comprising an electrical current boosting device which steeply boosts the electrical current supplied to the electrically conductive portion within a range of 5-10 A,
   wherein the electrical current boosting device shortens a time for supplying electrical current to the electrically conductive portion on the order of microseconds, and the electrical current boosting device is a condenser.

2. An ignition circuit for a squib, according to claim 1, wherein the condenser is disposed in parallel to the heat producing portion.

3. A squib according to claim 1, further comprising:
   a pair of electrical connecting terminals adapted to directly connect the squib to an external bus-type signal line; and
   an electrically conductive header directly electrically connecting the electrically conductive portion and the condenser to the pair of electrical connecting terminals such that electrical power can be directly supplied from the bus line to the electrically conductive portion and the condenser through the electrical connecting terminals and the header.

4. A squib according to claim 3, further comprising an ignition agent which becomes ignited by the heat producing portion.

5. A low energy squib comprising:
   a compact heat producing portion; and
   an ignition circuit for igniting the squib via the heat producing portion;
   the heat producing portion including an electrically conductive portion and a fuel portion disposed together in engagement with the conductive portion;
   the ignition circuit transmits electrical current to the electrically conductive portion which becomes heated, and heat produced thereby is transmitted to the fuel portion to ignite the fuel portion; and
   the ignition circuit includes an electrical current boosting device which steeply boosts the electrical current supplied to the electrically conductive portion within a range of 5-10 A,
   wherein the electrical current boosting device boosts the electrical current supplied to the electrically conductive portion such that a time for supplying electrical current to the electrically conductive portion sufficient to ignite the fuel portion is on the order of microseconds, and the electrical current boosting device is a condenser.

6. A squib, according to claim 5, wherein the condenser is disposed in parallel to the heat producing portion.

7. A squib according to claim 5, further comprising an ignition agent which is disposed in surrounding relation to the heat producing portion, and when the fuel portion is ignited it ignites the ignition agent.

8. A squib according to claim 7, further comprising an electrically conductive header, and said compact heat producing portion is disposed between the header and the ignition agent.

9. A squib according to claim 5, wherein the electrically conductive portion and the fuel portion are planar members.

10. A squib according to claim 5, further comprising:
    a pair of electrical connecting terminals adapted to directly connect the squib to an external bus-type signal line; and
    an electrically conductive header directly electrically connecting the electrically conductive portion and the condenser to the pair of electrical connecting terminals such that electrical power can be directly supplied from the bus line to the electrically conductive portion and the condenser through the electrical connecting terminals and the header.

11. A squib according to claim 10, further comprising an ignition agent which becomes ignited by the heat producing 12. A low energy squib comprising:
    a cap having a closed end;
    a compact heat producing portion;
    an ignition circuit for providing current to the heat producing portion;
    an ignition agent which becomes ignited by the heat producing portion; and
    an electrically conductive header which is disposed in the cap, with the ignition circuit, the heat producing portion and the ignition agent disposed in the cap between the header and the closed end of the cap;
    the heat producing portion including an electrically conductive portion and a fuel portion disposed together in engagement with the conductive portion;
    the ignition circuit transmits electrical current to the electrically conductive portion which becomes heated, and heat produced thereby is transmitted to the fuel portion to ignite the fuel portion, which thereby ignites the ignition agent; and
    the ignition circuit includes an electrical current boosting device which steeply boosts the electrical current supplied to the electrically conductive portion within a range of 5-10 A,
    wherein the electrical current boosting device boosts the electrical current supplied to the electrically conductive portion such that a time for supplying electrical current to the electrically conductive portion sufficient to ignite the fuel portion is on the order of microseconds, and the electrical current boosting device is a condenser.

13. A squib according to claim 12, wherein the electrically conductive portion and the fuel portion are planar members.

14. A squib according to claim 12, further comprising a pair of electrical connecting terminals which are directly connected to the electrically conductive portion and the electrical current boosting device through the header and are adapted to directly connect the squib to an external bus-type signal line such that electrical power can be directly supplied from the bus line to the electrically conductive portion and the electrical current boosting device through the electrical connecting terminals and the header.

15. A squib, according to claim 12, wherein the condenser is disposed in parallel to the heat producing portion.

* * * * *